United States Patent Office 3,439,504
Patented Apr. 22, 1969

3,439,504
DEVICES FOR REDUCING THE REAR-END DRAG OF JET ENGINES
René Paul Logerot, Paris, and Pierre André Alesi, Dammarie-les-Lys, France, assignors to Societe Nationale d'Etude et de Construction de Moteurs d'Aviation, Paris, France, a company of France
Filed May 8, 1967, Ser. No. 636,770
Claims priority, application France, May 11, 1966, 61,142
Int. Cl. F02k 1/14, 1/20; B64c 15/06
U.S. Cl. 60—271   1 Claim

ABSTRACT OF THE DISCLOSURE

A device for reducing the rear-end drag of a jet engine, comprising a fixed convergent ring located generally at the downstream end of the engine fairing, which may or may not be extended in the downstream direction by a number of "cold" flaps, said ring being provided on its downstream side with an aerodynamic slot through which, in sub-sonic and trans-sonic flight conditions, an airflow can be developed extending downstream of the said ring and directed in an inclined direction towards the axis of the jet engine, tangentially to and outside the "cold" flaps, when the latter are present and are in steeply inclined positions.

---

The present invention relates to a device which enables the rear-end drag of a jet engine, in particular a dual flow jet engine having re-heat facility, to be reduced when operated without re-heat under sub-sonic and trans-sonic flight conditions.

The invention is particularly useful for a mixed dual flow jet engine with re-heat, which has a main exit, nozzle provided with a number of hot-operated flaps and, generally at the downstream end of the engine fairing, a number of articulated cold-operated flaps. An arrangement of this kind enables better adaptation of the rear-end of the engine to differing flight conditions, i.e. sub-sonic, trans-sonic and supersonic flight, to be effected; in other words it makes it possible to avoid the very significant drag factors arising due to rear-end effects generally and in particular, change of section as between sub-sonic and trans-sonic flight.

In French Patent No. 1,410,424 it has been already proposed a solution to this problem, which consists in linking the positions of the "cold" articulated flaps at the downstream end of the engine fairing with the positions of the "hot" flaps on the nozzle.

It is an object of the present invention to create a device which will provide an alternative solution to the above-stated problem.

In accordance with the invention, this device comprises a fixed convergent ring located at the downstream end of the engine fairing, which may or may not be extended in the downstream direction by a number of cold flaps, the latter either free or linked to the hot flaps, which ring is provided on its downstream side with an aerodynamic slot through which, in sub-sonic and trans-sonic flight conditions, an airflow can be developed extending downstream of the said ring and directed in an inclined direction towards the axis of the jet engine (tangentially to and outside the cold flaps, when the latter are present and are in steeply inclined positions).

Advantageously, the fixed ring will be of truncate conical form and have an apex half-angle of approximately 5 degrees, to accord with supersonic flight.

The following description, which relates to the accompanying drawing given by way of a non-limitative example, will indicate how the invention may be carried into effect. In the drawing.

Figure 1:
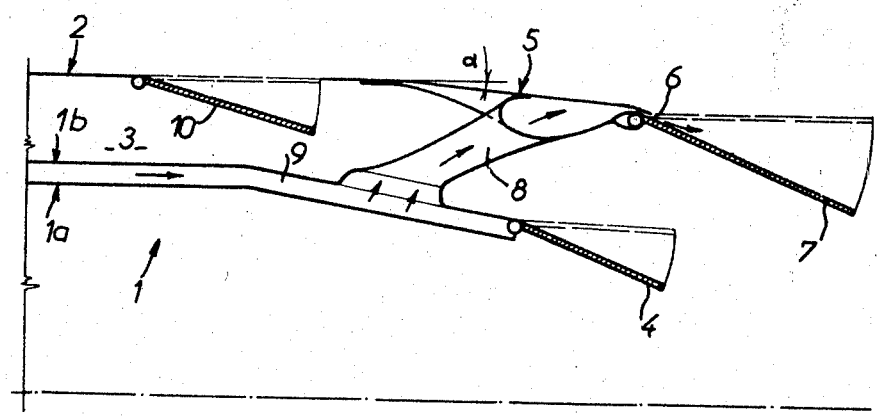
FIGURE 1 is a schematic half view, in longitudinal axial section, illustrating an embodiment of the invention which uses free flaps movable between two different configurations.

In FIGURE 1, the references 1 and 2 respectively indicate, in a general way, the main nozzle of a mixed dual flow jet engine with re-heat facility, and the engine fairing around this nozzle. The nozzle 1 and the fairing 2 delimit a secondary nozzle 3 connected to the air intake (not shown). The main nozzle 1 has a heat shield 1a and an external wall 1b. This nozzle is extended at its downstream end by a series of controlled "hot" flaps 4, the settings of which can be varied in accordance with the operating conditions of the engine, in order thus optimally to adapt its rear-end to a given flight condition. The positions of the flaps 4, as illustrated in full line, correspond to operation of the engine without re-heat (sub-sonic flight), whilst the positions indicated in broken line correspond to operation with maximum re-heat (supersonic flight). The fairing 2 of the engine is equipped at its downstream end with a convergent truncate conical ring 5, the apex half-angle α of which is approximately 5 degrees. This ring 5 is provided on its downstream side with an annular aerodynamic slot 6, and is extended by a series of free "cold" flaps 7 (although these flaps may equally well be linked in operation with the "hot" flaps), situated downstream of said slot 6. The slot 6 is supplied with gaseous fluid through radial passages 8 which receive the fluid entering the annular space 9 formed between the heat shield 1a and the external wall 1b of the main nozzle. These "cold" flaps have the convergent position illustrated in full line during sub-sonic flight, and in supersonic flight are locked in the divergent position illustrated in broken line. With steep inclinations of the flaps 7 (sub-sonic or trans-sonic flight), the aerodynamic slot directs, tangentially to the external faces of the said flaps, an airflow which is designed to prevent boundary layer breakaway, and thus prevents external drag due to change of section. At small or zero inclination of the flaps 7 (supersonic flight), the airflow through the slot 6 is inhibited.

Advantageously, the slot airflow will be controlled directly by the free or linked, "cold" flaps, as a function of their inclination.

In order to prevent the development of any significant vacuum, and consequently of high drag, at the rear-end portion outside the controlled "hot" flaps, this in the event that the airflow into the channel 3 from the intake should be insufficient, automatic traps 10 are provided in the external fairing 2 of the engine upstream of the nozzle exit, by means of which tertiary air can be drawn from the boundary layer outside the fairing, as required. In supersonic flight, with the re-heat switched in and the "cold" flaps locked in the divergent position, the output section defined by the "hot" and "cold" flaps is such as to permit the passage of a small airflow from the intake, the pressure of which is about two or three times the ambient pressure and which, besides effectively cooling the flaps, keeps the rear end zone of the engine supplied.

As described hereinbefore, the gaseous fluid supplying the aerodynamic slot 6 is derived from the annular space 9 created between the shield 1a and the nozzle external wall 1b; however, this fluid may alternatively be derived from the air intake or from any desired point in the compression cycle of the jet engine.

Figure 2:
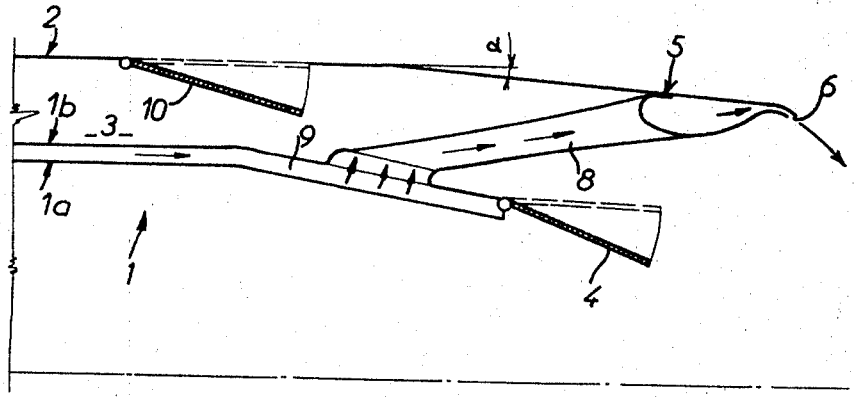
FIGURE 2 is a schematic half view, in longitudinal axial section, illustrating an embodiment of the invention without cold flaps, two different configurations again being indicated.

FIGURE 2 illustrates a variation on the embodiment of FIGURE 1, in which the "cold" flaps have been dispensed with.

The function of these flaps is taken over in sub-sonic or trans-sonic flight (no re-heat) by the peripheral jet issuing from the slot 6 situated on the downstream side of the fixed ring 5. This jet acts simultaneously on the external and internal airflows, and has the effect of lifting the static pressure level. In supersonic flight (with maximum re-heat) the jet is cut off, and the ring 5, which in this embodiment completely encloses the "hot" flaps 4, ensures that there is no breakaway in the external airflow.

Advantageously, the jet flow will be regulated by the "hot" flaps as a function of their inclination.

The device in accordance with the invention, due to the reduction which it effects in the external rear-end drag by ensuring good external airflow over the change in section produced due to the slot action, this even at steep settings of the "cold" flaps, enables nozzles of the "blow in doors" type to be employed, which are of compact design and require only moderate cross-sections of the tertiary air traps which take air from the boundary layer at the engine fairing.

It goes without saying that the invention is not limited to the embodiments specifically described above, and that various modifications thereof are possible within the scope of the invention, as defined by the appended claim.

What is claimed is:

1. A device for reducing the rear-end drag of a jet engine, comprising a nozzle disposed within an aircraft fairing having a convergent rear-end portion, said nozzle comprising a jet pipe having hot flaps hinged to its rear-end and an annular cooling duct provided between said pipe and said fairing, the internal and external surfaces of said hot flaps being exposed respectively to jetstream through the pipe and to cooling gaseous fluid flowing through said duct, and means for carrying the inclination of said flaps to the general direction of jetstream from zero to steep inclinations for the purpose of controlling the area of the outlet end of the nozzle, said device comprising an inwardly and rearwardly facing annular slot provided at the rear-end of said fairing and means for discharging gaseous fluid through said slot when said hot flaps are steeply inclined to the general direction of jetstream.

References Cited

UNITED STATES PATENTS

| 3,038,304 | 6/1962 | Alford | 239—265.41 |
| 3,062,003 | 11/1962 | Hamiton | 239—265.41 |
| 3,263,417 | 8/1966 | Hooker | 244—42.41 |

FOREIGN PATENTS

| 626,476 | 8/1961 | Canada. |
| 1,219,541 | 12/1959 | France. |

CARLTON R. CROYLE, *Primary Examiner.*

DOUGLAS HART, *Assistant Examiner.*

U.S. Cl. X.R.

60—261, 263, 264; 239—265.33, 265.37, 265.39, 265.41